United States Patent Office 3,474,130
Patented Oct. 21, 1969

3,474,130
METHOD FOR THE PRODUCTION OF β,γ-UNSATURATED ACID ESTERS FROM α,β-UNSATURATED ACID HALIDES
Toshitsugu Ozeki and Masakatsu Kusaka, Yokkaichi-shi, Japan, assignors, by mesne assignments, to Kyowa Yuka Co., Ltd., Chiyoda-ku, Tokyo, Japan
No Drawing. Filed Sept. 20, 1966, Ser. No. 580,605
Claims priority, application Japan, Oct. 30, 1965, 40/66,582
Int. Cl. C07c *67/00*
U.S. Cl. 260—486                3 Claims This invention relates to a method for the production of γ-unsaturated acid esters represented by the general formula

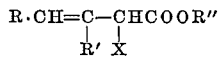

wherein R is hydrogen or an alkyl group having 1 to 3 carbon atoms; R' is hydrogen or a methyl group; X is hydrogen or halogen atom; and R" is an alkyl group having 1 to 6 carbon atoms. The compounds of the above series are useful as intermediates for the synthesis of organic compounds. As methods for synthesizing the compounds of the above series, there have heretofore been adopted, for example in the case of a vinyl acetic acid ester, a process through an allyl cyanide, and a process by way of the carbonylation reaction of allyl chloride. In addition, a process carried out by reacting an acyl halide with alcohol to produce a corresponding ester has conventionally been adopted as a method for synthesizing a pure substance, and it has been considered that no transfer of double bonds takes place in the above reaction.

The present inventors have found that an α,β-unsaturated acid halide is reacted with a compound having an alcoholic hydroxyl group in the presence of a tertiary amine to produce a desired substance, and that the above reaction accompanies the transfer of double bonds, and a β,γ-unsaturated acid ester, which is less stable than α,β-isomer, can be easily produced in a high yield from an α,β-unsaturated acid ester. This reaction may be represented by the following chemical equation:

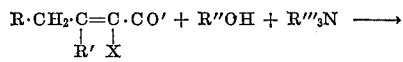

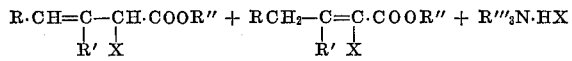

wherein R, R', R" and X are as defined above; R'" is an alkyl group; and X' is a halogen atom.

The solvent to be employed in the practice of the present invention may be any one of (1) aliphatic or alicyclic hydrocarbons, (2) aromatic hydrocarbons, (3) ketones, (4) ethers, (5) alcohols having 1 to 6 carbon atoms, and (6) nitriles. The tertiary amine to be used is an aliphatic or alicyclic tertiary amine containing or not containing heterocyclic atom (5), and the use of one higher in basicity is advantageous. The reaction temperature adopted is from —50° to +30° C.

The following examples illustrate the invention:

EXAMPLE 1

0.75 mole of ethyl alcohol and 0.5 mole of triethylamine were dissolved in 100 g. of benzene. To the solution, 0.5 mole of crotonic acid chloride was added dropwise with stirring, whereby the deposition of solid immediately occurred. During the above period, the reaction temperature was maintained at 22°–28° C. After completion of the reaction, the solids were removed by filtration and the filtrate was fractionated after water washing and drying. The total yield of esters was 95.5% and the yield of ethyl vinylacetate was 91.8%.

| Isomer produced | Product ratio (percent) | Boiling point (° C./ mm. Hg) | Refractive index ($n_D^{20}$) | Saponification value | Iodine number |
|---|---|---|---|---|---|
| Ethyl vinylacetate | 96.1 | 53.0–53.4/58 | 1.4109 | 496 | 221 |
| Ethyl trans crotonate | 3.3 | 57.5–57.8/47 | 1.4251 | 495 | 216 |
| Ethyl cis crotonate | 0.6 | 58.6–58.8/68 | 1.4253 | 495 | 216 |

EXAMPLE 2

Example 1 was repeated using 0.75 mole of methyl alcohol in place of the ethyl alcohol. In this case, the total yield of esters was 99% and the yield of methyl vinylacetate was 86.9%.

| Isomer produced | Product ratio (percent) | Boiling point (° C./ mm. Hg) | Refractive index ($n_D^{20}$) | Saponification value | Iodine number |
|---|---|---|---|---|---|
| Methyl vinylacetate | 87.8 | 53.8–54.0/106 | 1.4085 | 563 | 245 |
| Methyl trans-crotonate | 11.0 | 68.8–69.6/118 | 1.4254 | 562 | 248 |
| Methyl cis-crotonate | 1.0 | | 1.4258 | | |

EXAMPLE 3

Example 1 was repeated using 0.75 mole of t-butyl alcohol in place of the ethyl alcohol. In this case, the total yield of esters was 65% and the yield of t-butyl vinylacetate was 63%.

| Isomer produced | Product ratio (percent) | Boilingpoint (° C./mm. Hg) | Refractive index ($n_D^{20}$) | Iodine number |
|---|---|---|---|---|
| t-Butyl vinyl acetate | 96.9 | 68.8–69.4/68 | 1.4135 | 173 |
| t-Butyl trans-crotonate | 1.9 | | | |
| t-Butyl cis-crotonate | 1.2 | | | |

EXAMPLE 4

Example 1 was repeated using 0.75 mole of cyclohexanol in place of the ethyl alcohol. In this case, the total yield of esters was 68.8% and the yield of cyclohexyl vinylacetate was 67.0%.

| Isomer produced | Product ratio (percent) | Boliling point (° C./ mm. Hg) | Refractive index |
|---|---|---|---|
| Cyclohexyl vinylacetate | 97.4 | 115/55 | 1.4561 |
| Cyclohexyl trans-crotonate | 0.6 | | |
| Cyclohexyl cis-crotonate | 1.9 | | |

EXAMPLE 5

Example 1 was repeated using 0.75 mole of crotyl alcohol in place of the ethyl alcohol. In this case, the total yield of esters was 86.9% and the yield of crotyl vinylacetate was 78.4%.

| Isomer produced | Product ratio (percent) | Boiling point (° C./mm. hg) | Refractive index | Saponification value |
|---|---|---|---|---|
| Crotyl vinylacetate | 91.3 | 98–99/97 | 1.4420 | 353 |
| Crotyl trans-crotonate | 7.7 | 89/70 | 1.4543 | 350 |
| Crotyl cis-crotonate | 1.0 | | | |

EXAMPLE 6

Example 1 was repeated using 0.5 mole of crotonic acid bromide in place of the crotonic acid chloride. In this case, the total yield of esters was 94% and the yield of ethyl vinylacetate was 90%.

Isomer produced: Product ratio, percent
 Ethyl vinylacetate _____ 95.4
 Eethyl trans-crotonate _____ 3.5
 Ethyl cis-crotonate _____ 0.9

EXAMPLE 7

Example 1 was repeated using 0.5 mole of tributylamine in place of the triethylamine. In this case, the total yield of esters was 91.2% and the yield of vinylacetate was 78.5%.

Isomer produced: Product ratio, percent
 Ethyl vinylacetate _____ 86.1
 Ethyl trans-crotonate _____ 13.1
 Ethyl cis-crotonate _____ 0.9

EXAMPLE 8

Example 1 was repeated using 0.5 mole of N-ethylmorpholine in place of the triethylamine. In this case, the total yield of esters was 90% and the yield of ethyl vinylacetate was 61%.

Isomer produced: Product ratio, percent
 Ethyl vinylacetate _____ 67.6
 Ethyl trans-crotonate _____ 28.5
 Ethyl cis-crotonate _____ 3.8

EXAMPLE 9

Example 1 was repeated using 0.5 mole of ethylpiperidine in place of the triethylamine. In this case, the total yield of esters was 93% and the yield of ethyl vinylacetate was 84%.

Isomer produced: Product ratio, percent
 Ethyl vinylacetate _____ 90.9
 Eethyl trans-crotonate _____ 7.7
 Ethyl cis-crotonate _____ 1.4

EXAMPLE 10

0.75 mole of methyl alcohol and 0.5 mole of triethylamine were dissolved in 100 g. of benzene. To the solution, 0.5 mole of $\beta,\beta$-dimethylacrylic acid chloride was added dropwise with stirring. The reaction solution immediately became turbid and the deposition of solids began to occur. During the above period, the reaction temperature was maintained at about 25° C. After completion of the reaction, the solids were removed by filtration and the filtrate was fractionated after water-washing and drying. The total yield of esters was 95.5% and the composition of the product was as follows:

| Isomer produced | Product ratio (percent) | Boiling point | Refractive index ($n_D^{20}$) |
|---|---|---|---|
| Methyl 3-methyl-3-butenoate | 83.1 | 120.0–121.3 | 1.4172 |
| Methyl $\beta,\beta$-dimethylacrylate | 16.9 | 129.0–130.2 | 1.4379 |

EXAMPLE 11

Example 10 was repeated using 0.5 mole of ethyl piperidine in place of the triethylamine. In this case, the total yield of esters was 93% and the composition of the product was as follows:

Isomer produced: Product ratio, percent
 Methyl 3-methyl-3-butenoate _____ 89.6
 Methyl $\beta,\beta$-dimethylacrylate _____ 10.4

EXAMPLE 12

Example 10 was repeated using 0.5 mole of methylpiperidine in place of the triethylamine. In this case, the total yield of esters was 95% and the composition of the product was as follows:

Isomer produced: Product ratio, percent
 Methyl 3-methyl-3-butenoate _____ 75.7
 Methyl $\beta,\beta$-dimethylacrylate _____ 24.3

EXAMPLE 13

Example 10 was repeated using 0.5 mole of ethylmorpholine in place of the triethylamine. In this case, the total yield of esters was 96% and the composition of the product was as follows:

Isomer produced: Product ratio, percent
 Methyl 3-methyl-3-butenoate _____ 69.1
 Methyl $\beta,\beta$-dimethylacrylate _____ 30.9

EXAMPLE 14

Example 10 was repeated using 2-pentenoic acid chloride in place of the $\beta,\beta$-dimethylacrylic acid chloride. In this case the total yield of esters was 96% and the composition of the product was as follows:

| Isomer produced | Product ratio (percent) | Boiling point (° C.) | Refractive index |
|---|---|---|---|
| Methyl 3-pentenoate | 83.7 | 133.1–133.b | 1.4222 |
| Methyl 2-pentenoate | 14.8 | 137.0–137.5 | 1.4313 |
| Unconfirmed product | 1.5 | | |

EXAMPLE 15

Example 10 was repeated using 0.5 mole of 2-pentoic acid chloride in place of the $\beta,\beta$-dimethylacrylic acid chloride and 0.5 mole of pyridine in place of the triethylamine. In this case, the total yield of esters was 92% and the composition of the product was as follows:

Isomer produced: Product ratio, percent
 Methyl 3-pentenoate _____ 53.8
 Methyl 2-pentenoate _____ 39.0
 Unconfirmed product _____ 7.2

EXAMPLE 16

Example 10 was repeated using 0.5 mole of 2-hexenoic acid chloride in place of the $\beta,\beta$-dimethylacrylic acid chloride. In this case, the total yield of esters was 94% and the composition of the product was as follows:

| Isomer produced | Product ratio (percent) | Boiling point ° C. | Refractive index ($n_D^{20}$) |
|---|---|---|---|
| Methyl 3-hexenoate | 77.2 | 150.2–151.1 | 1.4269 |
| Methyl 2-hexenoate | 20.9 | 155.0–155.5 | 1.4349 |
| Unconfirmed product | 1.9 | | |

EXAMPLE 17

Example 14 was repeated using 0.75 mole of ethyl alcohol in place of the methyl alcohol. In this case, the total yield of esters was 93% and the composition of the product was as follows:

| Isomer produced | Product ratio (Percent) | Boiling point (° C.) |
|---|---|---|
| Ethyl 3-pentenoate | 92.9 | 148.1–149.5 |
| Ethyl 2-pentenoate | 6.0 | |
| Unconfirmed product | 1.0 | |

EXAMPLE 18

Example 1 was repeated using 0.5 mole of α-chlorocrotonic acid chloride in place of the crotonic acid chloride. In this case, the total yield of esters was 90% and the composition of the product was as follows:

| Isomer produced | Product ratio (percent) | Boiling point (° C.) | Refractive index ($n_D^{20}$) |
|---|---|---|---|
| Ethyl α-chlorovinylacetate | 16.3 | 162.8–163.3 | 1.4391 |
| Ethyl α-chlorocrotonate | 83.3 | 169.0–170.0 | 1.4529 |
| Unconfirmed product | 0.4 | | |

EXAMPLE 19

Example 18 was repeated using 250 g. of ether in place of the benzene and adopting a reaction temperature of about −50° C. In this case, the total yield of esters was 91% and the composition of the product was as follows:

Isomer produced: Product ratio, percent
- Ethyl α-chlorovinylacetate _____ 62.6
- Ethyl α-chlorocrotonate _____ 36.8
- Unconfirmed product _____ 0.6

What we claim is:
1. A process for preparing a β,γ-unsaturated acid ester which comprises reacting at a temperature of below 30° C. an α,β-unsaturated acid halide, wherein the γ,β-unsaturated acid halide has the general formula

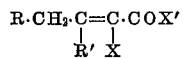

wherein R is hydrogen or an alkyl group having 1–3 carbon atoms; R' is hydrogen or a methyl group; X is hydrogen or halogen atom; and X' is a halogen atom with a compound having an alcoholic hydroxyl group in the presence of a tertiary amine in a solvent having no active hydrogen atom.

2. A process according to claim 1, wherein the compound having an alcoholic hydroxyl group is an alcohol having the general formula of ROH where R is an alkyl group having 1–6 carbon atoms.

3. A process according to claim 1 wherein the tertiary amine is a member selected from the group consisting of aliphatic tertiary amines and alicyclic tertiary amines.

References Cited

UNITED STATES PATENTS 3,254,115   5/1966   Cohen et al. _____ 260—486
3,338,961   8/1967   Closson et al. ____ 260—486 XR

OTHER REFERENCES

Butler et al., Can. J. Chem., vol. 41(10), pp. 2492–2499 (1963).

Tsuji et al., J. Am. Chem. Soc., vol. 86, pp. 4350–4354 (1964).

LORRAINE A. WEINBERGER, Primary Examiner

A. P. HALLUIN, Assistant Examiner